(12) United States Patent
Lu et al.

(10) Patent No.: US 12,535,272 B2
(45) Date of Patent: Jan. 27, 2026

(54) CONSTRUCTION METHOD OF FIBER LINING SURFACE OF ETHYLENE CRACKING FURNACE

(71) Applicant: LUYANG ENERGY-SAVING MATERIALS CO., LTD., Shandong (CN)

(72) Inventors: Chenghong Lu, Shandong (CN); Guijuan Li, Shandong (CN); Kai Chen, Shandong (CN); Meihua Xu, Shandong (CN); Deli Ren, Shandong (CN)

(73) Assignee: LUYANG ENERGY-SAVING MATERIALS CO., LTD., Shandong (CN)

( * ) Notice: Subject to any disclaimer, the term of this patent is extended or adjusted under 35 U.S.C. 154(b) by 692 days.

(21) Appl. No.: 17/777,631

(22) PCT Filed: Nov. 9, 2021

(86) PCT No.: PCT/CN2021/129471
§ 371 (c)(1),
(2) Date: May 18, 2022

(87) PCT Pub. No.: WO2022/100562
PCT Pub. Date: May 19, 2022

(65) Prior Publication Data
US 2023/0243587 A1    Aug. 3, 2023

(30) Foreign Application Priority Data
Nov. 10, 2020    (CN) .................. 202011246734.X

(51) Int. Cl.
*F27D 1/16*    (2006.01)
*C10G 9/18*    (2006.01)
*F27D 1/00*    (2006.01)

(52) U.S. Cl.
CPC ............. *F27D 1/1684* (2013.01); *C10G 9/18* (2013.01); *F27D 1/0009* (2013.01)

(58) Field of Classification Search
CPC .... F27D 1/0006; F27D 1/0009; F27D 1/0013; F27D 1/0016; F27D 1/002; F27D 1/16;
(Continued)

(56) References Cited

U.S. PATENT DOCUMENTS

| 3,780,396 A | 12/1973 | Werner | |
| 4,673,594 A * | 6/1987 | Smith | C04B 30/02 427/427 |

(Continued)

FOREIGN PATENT DOCUMENTS

| CN | 201463502 U | 5/2010 |
| CN | 102425949 A * | 4/2012 |

(Continued)

OTHER PUBLICATIONS

English translation of CN 102425949. Apr. 25, 2012. (Year: 2012).*
(Continued)

*Primary Examiner* — Xiao S Zhao
*Assistant Examiner* — Joseph S Leyson
(74) *Attorney, Agent, or Firm* — Yue (Robert) Xu; Apex Attorneys at Law, LLP

(57) ABSTRACT

A construction method of a fiber lining surface of an ethylene cracking furnace includes the following steps: S1, leveling the fiber lining surface; S2, wetting the leveled fiber lining surface; S3, rooting the wetted fiber lining surface; and S4, coating, before the fiber lining surface is dried, high-temperature paint to the fiber lining surface that has been rooted; and reserving multiple expansion sews on the fiber lining surface during the coating process. According to the construction method of the high-temperature paint for full fiber lining structure of the ethylene cracking furnace,
(Continued)

the high-temperature paint is firmly bonded with the lining, and will not crack or fall off during use, protecting the full fiber lining by the coating and greatly extending the service life of the lining.

8 Claims, 1 Drawing Sheet

(58) Field of Classification Search
CPC .... F27D 1/1678; F27D 1/1684; F27D 1/1689; C10G 9/18
See application file for complete search history.

(56) References Cited

U.S. PATENT DOCUMENTS

| | | | | |
|---|---|---|---|---|
| 2009/0252660 | A1* | 10/2009 | Olver et al. | ........ C04B 41/5089 422/600 |
| 2012/0063912 | A1 | 3/2012 | Bouillon et al. | |

FOREIGN PATENT DOCUMENTS

| | | | |
|---|---|---|---|
| CN | 102924099 | A | 2/2013 |
| CN | 203411560 | U | 1/2014 |
| CN | 103868360 | A | 6/2014 |
| CN | 104197718 | A | 12/2014 |
| CN | 106065203 | A | 11/2016 |
| CN | 206536026 | U | 10/2017 |
| CN | 210321197 | U | 4/2020 |
| CN | 111765768 | A | 10/2020 |
| CN | 112378252 | A | 2/2021 |
| DE | 2113308 | A1 | 11/1971 |
| FR | 1188673 | A | 9/1959 |
| GB | 847614 | A | 9/1960 |
| JP | H05106972 | A | 4/1993 |
| JP | H11130551 | A | 5/1999 |
| JP | H11211357 | A | 8/1999 |
| JP | 2002265282 | A | 9/2002 |
| JP | 2020143822 | A | 9/2020 |
| RU | 2157493 | C1 | 10/2000 |
| RU | 2523265 | C2 | 7/2014 |

OTHER PUBLICATIONS

English translation of CN 201463502. May 12, 2010 (Year: 2010).*
English translation of CN 206536026. Oct. 3, 2017 (Year: 2017).*
English translation of CN 103065203. Nov. 2, 2016. (Year: 2016).*
International Search Report for PCT/CN2021/129471 mailed Dec. 29, 2021, ISA/CN.
The 1st Office Action dated May 5, 2022 for the Chinese Patent Application No. CN202011246734.X.
The 1st Office Action issued on Feb. 27, 2023 for Japanese patent application No. JP2022-506396.
The 1st Office Action issued on Nov. 30, 2022 for the Russian Patent Application No. RU2022111002.

* cited by examiner

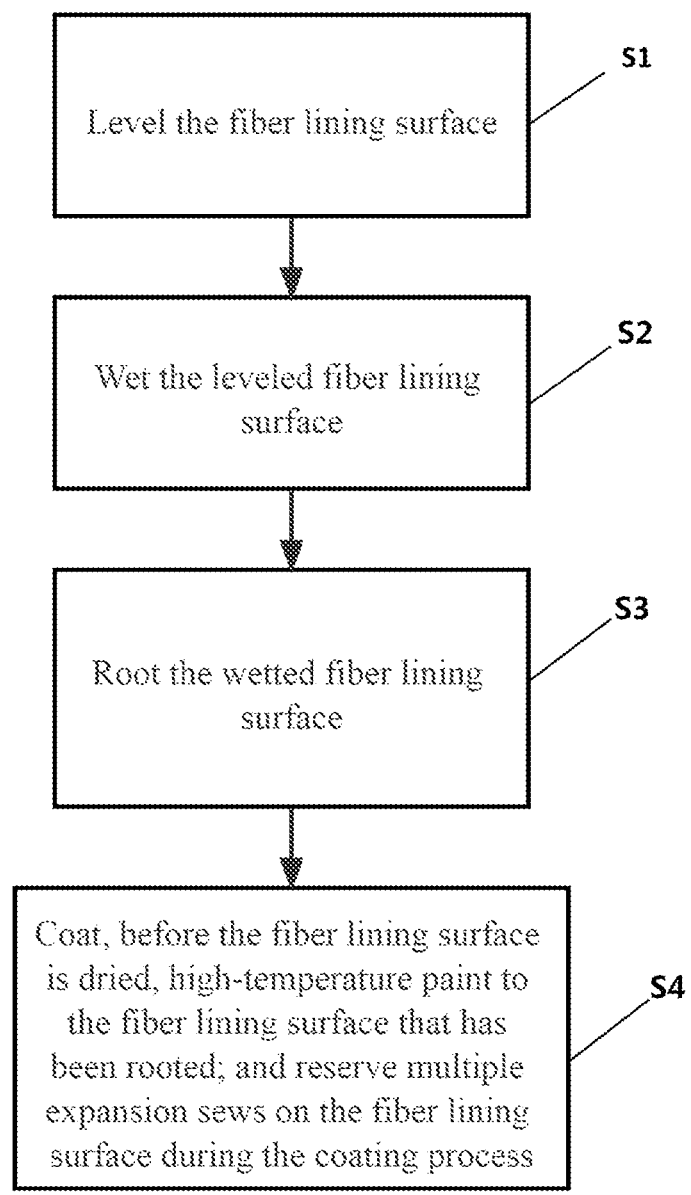

CONSTRUCTION METHOD OF FIBER LINING SURFACE OF ETHYLENE CRACKING FURNACE

The present application is the national phase of International Patent Application No. PCT/CN2021/129471, titled "CONSTRUCTION METHOD OF FIBER LINING SURFACE OF ETHYLENE CRACKING FURNACE", filed on Nov. 9, 2021, which claims the priority to Chinese Patent Application No. 202011246734.X, titled "CONSTRUCTION METHOD OF FIBER LINING SURFACE OF ETHYLENE CRACKING FURNACE", filed with the China National Intellectual Property Administration on Nov. 10, 2020, the entire contents of which are incorporated herein by reference.

FIELD

The present application relates to the technical field of chemical equipment, and in particular to a construction method of a fiber lining surface of an ethylene cracking furnace.

BACKGROUND

In petrochemical industry, the cracking device is one of the most energy-consuming devices. With the society's higher requirements for energy saving and emission reduction, it is extremely important to improve the thermal efficiency of the cracking device. Therefore, the refractory lining of the cracking furnace is not only required to meet the requirements of high temperature use, but also needs to have sufficient strength and high thermal efficiency to achieve the effects of erosion resistance and energy saving.

The conventional brick wall lining structure has high thermal conductivity and low thermal efficiency. In addition, due to the poor thermal shock resistance of the brick wall structure, the lining cracks due to thermal stress during long-term use at high-temperature. The expansion of the cracks causes the brick wall structure to fall off, thereby reducing the service life of the lining. In order to improve the thermal efficiency of the ethylene cracking furnace, the full-fiber lining has become a research focus because of its low thermal conductivity and good thermal shock resistance. For the composite lining structure that uses ceramic fiber blankets, ceramic fiber boards, ceramic fiber modules and the like alone, due to the poor wind erosion resistance of fiber products, fibers become powder after long-term influence of wind speed and furnace atmosphere, reducing the service life of the lining.

SUMMARY

An object of the present application is to provide a construction method of a fiber lining surface of an ethylene cracking furnace, which solves the problems that the current high-temperature paint construction of the full fiber furnace lining is not standardized, the method is unscientific, the service life of the paint is short after construction, and the paint is easy to separate from the fiber lining and is easy to fall off.

In order to achieve the above object, a construction method of the fiber lining surface of the ethylene cracking furnace is provided according to the present application, which includes the following steps:

S1, leveling the fiber lining surface;
S2, wetting the leveled fiber lining surface;
S3, rooting the wetted fiber lining surface;
S4, coating, before the fiber lining surface is dried, high-temperature paint to the fiber lining surface that has been rooted; and reserving multiple expansion sews on the fiber lining surface during the coating process.

In an embodiment, the step of leveling the fiber lining surface is specifically as follows:
flapping uneven parts of the fiber lining surface with a flat plate, so as to keep the sew edges of any two adjacent fiber modules in the same plane.

In an embodiment, the step of wetting the leveled fiber lining surface is specifically as follows:
spraying water on the leveled fiber lining surface, 480-520 g of water per square meter of the fiber lining surface.

In an embodiment, the step of wetting the leveled fiber lining surface is specifically as follows:
spraying a wetting agent on the leveled fiber lining surface, wherein the wetting agent is specifically a diluent of silica sol and water, and the solid content of the silica sol is 28-35%;
in case that a mass ratio of water in the wetting agent to the silica sol is (0.9-1.1):1, 950-1100 g of the wetting agent is used per square meter of the fiber lining surface; and
in case that a mass ratio of water in the wetting agent to the silica sol is (1.8-2.2):1, 750-850 g of the wetting agent is used per square meter of the fiber lining surface.

In an embodiment, the step of rooting the wetted fiber lining surface is specifically as follows:
punching 3-5 holes per square meter of the fiber lining surface, wherein the hole diameter is 10-20 cm, and the hole depth is 20-50 cm; and
filling up all the holes with the paint.

In an embodiment, the step of coating, before the fiber lining surface is dried, high-temperature paint to the fiber lining surface that has been rooted is specifically as follows:
coating layer by layer with a stainless steel trowel, wherein the coating thickness of each layer is 3-8 mm, and 5-10 kg of high-temperature paint is used per square meter of the fiber lining surface.

In an embodiment, the step of coating, before the fiber lining surface is dried, high-temperature paint to the fiber lining surface that has been rooted is specifically as follows:
coating layer by layer with an air compression coating device, wherein each layer is dried for 30-60 minutes after coating, and then the next layer is coated, and 5-10 kg of high-temperature paint is used per square meter of the fiber lining surface.

In an embodiment, the step of coating layer by layer with an air compression coating device is specifically as follows:
adjusting an air pressure of the air compression coating device to 4 kg, controlling a spraying distance to 20-80 cm, and spraying for 2-3 mm per layer, and coating layer by layer; or,
adjusting the air pressure of the air compression coating device to 5 kg, controlling the spraying distance to 20-80 cm, and spraying for 2-3 mm per layer, and coating layer by layer; or,
adjusting the air pressure of the air compression coating device to 6 kg, controlling the spraying distance to 20-50 cm, and spraying for 2-3 mm per layer, and coating layer by layer.

In an embodiment, before the step of coating, before the fiber lining surface is dried, high-temperature paint to the fiber lining surface that has been rooted, the construction method further includes:

stirring the high-temperature paint, and when the high-temperature paint becomes viscous due to long-term storage, adding water accounting for 1%~2% to the high-temperature paint for dilution, and stirring, so that the high-temperature paint and water can be evenly mixed.

In an embodiment, the step of reserving multiple expansion sews on the fiber lining surface during the coating process is specifically as follows:

reserving an expansion sew with a width of 5-10 mm each time the high-temperature paint is sprayed on the fiber lining surface for 3-5 m.

Compared with the above background technology, the construction method of the fiber lining surface of the ethylene cracking furnace provided by embodiments of the present application includes the following steps:

S1, leveling the fiber lining surface;
S2, wetting the leveled fiber lining surface;
S3, rooting the wetted fiber lining surface;
S4, coating, before the fiber lining surface is dried, high-temperature paint to the fiber lining surface that has been rooted; and reserving multiple expansion sews on the fiber lining surface during the coating process.

In such construction method, the fiber lining surface is leveled and wetted before the high-temperature paint is sprayed, ensuring that the high-temperature paint and the fiber lining can be firmly combined. In this specification, the fiber lining is rooted before the coating process, so that the coating layer and the paint for rooting and grouting form a whole, and the paint is fired at high temperature to form a ceramic bond, and the coating layer is bonded more firmly. In addition, expansion sews are reserved for the paint after the coating process, which avoids the formation of cracks on the surface of the high-temperature paint due to the different expansion coefficients of the fiber lining and the high-temperature paint during use in the furnace. According to the construction method of the high-temperature paint for full fiber lining structure of the ethylene cracking furnace of the present application, the high-temperature paint is firmly bonded with the lining, and will not crack or fall off during use, protecting the full fiber lining by the coating and greatly extending the service life of the lining.

BRIEF DESCRIPTION OF THE DRAWINGS

For more clearly illustrating embodiments of the present application or the technical solutions in the conventional technology, drawings to be used in the description of the embodiments or the conventional technology will be briefly described hereinafter. Apparently, the drawings in the following description are only some embodiments of the present application. For those skilled in the art, other drawings may be obtained based on the provided drawings without any creative work.

FIG. 1 is a flow chart of a construction method of a fiber lining surface of an ethylene cracking furnace provided by embodiments of the present application.

DETAILED DESCRIPTION OF THE EMBODIMENTS

Technical solutions of embodiments of the present application are clearly and completely described hereinafter in conjunction with the drawings of the embodiments of the present application. Apparently, the embodiments described in the following are only some embodiments of the present application, rather than all embodiments. Based on the embodiments in the present application, all of the other embodiments which are obtained by those skilled in the art without any creative work fall within the protection scope of the present application.

In order to provide the person skilled in the art with a better understanding of the solution of the present application, the present application is described hereinafter in further detail in conjunction with the drawings and embodiments.

First Embodiment

The construction method of the fiber lining surface of the ethylene cracking furnace provided by the embodiments of the present application, as shown in FIG. 1 of the specification, includes the following steps:

S1, leveling the fiber lining surface; wherein after the construction of a back lining layer and fiber modules of the ethylene cracking furnace is completed, the fiber lining surface needs to be leveled, and uneven parts of the fiber lining surface are flapped with a flat plate until sew edges of adjacent fiber modules are kept on the same plane, that is, the fiber lining surface is flapped to be flat, so that the fiber lining surface is a flat surface;

S2, wetting the fiber lining surface; wherein, in order to improve the bonding effect of high-temperature paint and the fiber lining, it is required to wet the fiber lining surface with a wetting agent; the above wetting agent is water, and is sprayed on the surface by a spraying device, 480-520 g, preferably 500 g, of water is sprayed on each square meter of the fiber lining for surface wetting;

S3, rooting the wetted fiber lining surface; wherein, a punching machine may be used to perforate the fiber lining surface, 3-5 holes are punched for each square meter of the fiber lining, the hole diameter is 10-20 mm, and the hole depth is 20-50 mm; then the paint for rooting is filled into a glue gun, and the paint is injected into the holes with the glue gun until the holes are filled up with the paint for rooting;

S4, coating the paint; wherein, the high-temperature paint is coated to the fiber lining surface by applying or spraying before the wetting agent on the fiber lining surface is dried; in a case that the high-temperature paint is applied to the fiber lining surface, the high-temperature paint is applied evenly with a stainless steel trowel for times, and the coating thickness is 3-8 mm; in a case that the high-temperature paint is sprayed to the fiber lining surface, an air compression spraying method is used for spraying; first, a special spraying device is cleaned to ensure that a pipeline of the spraying device is clean and smooth to prevent the spraying device from clogging; then the paint is filled in the spraying device for spraying, the air pressure is 4 kg, the spraying distance is 20-80 cm, the paint is sprayed for 2-3 mm each time, next spraying is performed after natural drying of 30-60 minutes, so on and on until the coating thickness meets the design requirements. 5-10 kg of high-temperature paint is required per square meter of the fiber lining for the applying method and the spraying method.

In step 4, expansion sews need to be reserved, so as to avoid the formation of cracks on the surface of the high-temperature paint due to the different expansion coefficients of the fiber lining and the high-temperature paint during use in the furnace. It is required to reserve an expansion sew with a width of 5-10 mm every 3-5 m, that is, the expansion sews are vertically arranged.

The above high-temperature paint needs to be stirred with a mixer before spraying. If the coating becomes viscous due to long-term storage, water accounting for 1%~2% can be added for dilution and stirring. The stirring must be sufficient so that the coating and water can be evenly mixed.

Second Embodiment

The construction method of the fiber lining surface of the ethylene cracking furnace includes the following steps:
- S1, similar to the first embodiment, leveling the fiber lining surface; wherein after the construction of the back lining layer and the fiber modules of the ethylene cracking furnace is completed, the fiber lining surface needs to be leveled, and uneven parts of the fiber lining surface are flapped with a flat plate until sew edges of adjacent fiber modules are kept on the same plane;
- S2, wetting the fiber lining surface; differing from the first embodiment, the wetting agent in this embodiment is not water but a diluent of silica sol and water; specifically, in order to improve the bonding effect of the high-temperature paint and the fiber lining, it is required to wet the fiber lining surface with the wetting agent; the wetting agent is specifically a diluent of silica sol and water, and the solid content of the silica sol is 28-35%, preferably, 30%; a mass ratio of water in the wetting agent to the silica sol is (0.9-1.1):1, preferably, 1:1; 950-1100 g of the wetting agent is used per square meter of the fiber lining surface, preferably, 1000 g;
- wherein the silica sol may specifically be silicon dioxide sol, and the solid content of the silicon dioxide sol is 28-35%;
- S3, rooting the wetted fiber lining surface; similar to the first embodiment; wherein, a punching machine is used to perforate the fiber lining surface, 3-5 holes are punched for each square meter of the fiber lining, the hole diameter is 10-20 mm, and the hole depth is 20-50 mm; then the paint for rooting is filled into a glue gun, and the paint is injected into the holes with the glue gun until the holes are filled up with the paint for rooting;
- S4, coating the paint differing from the first embodiment, the applying can be performed at a different air pressure and a different spraying distance; that is, the high-temperature paint is coated to the fiber lining surface by applying or spraying before the wetting agent on the fiber lining surface is dried; in a case that the high-temperature paint is applied to the fiber lining surface, the high-temperature paint is applied evenly with a stainless steel trowel for times, and the coating thickness is 3-8 mm; in a case that the high-temperature paint is sprayed to the fiber lining surface, an air compression spraying method is used for spraying; first, a special spraying device is cleaned to ensure that a pipeline of the spraying device is clean and smooth to prevent the spraying device from clogging; then the paint is filled in the spraying device for spraying, the air pressure is 5 kg, the spraying distance is 20-80 cm, the paint is sprayed for 2-3 mm each time, next spraying is performed after natural drying of 30-60 minutes, so on and on until the coating thickness meets the design requirements. 5-10 kg of high-temperature paint is required per square meter of the fiber lining for the applying method and the spraying method.

Similarly, expansion sews need to be reserved. In order to avoid the formation of cracks on the surface of the high-temperature paint due to the different expansion coefficients of the fiber lining and the high-temperature paint during use in the furnace, it is required to reserve an expansion sew with a width of 5-10 mm every 3-5 m.

The above high-temperature paint needs to be stirred with a mixer before spraying. If the coating becomes viscous due to long-term storage, water accounting for 1%~2% can be added for dilution and stirring. The stirring must be sufficient so that the coating and water can be evenly mixed.

Third Embodiment

The construction method of the fiber lining surface of the ethylene cracking furnace includes the following steps:
- S1, similar to the first embodiment, leveling the fiber lining surface; wherein after the construction of the back lining layer and the fiber modules of the ethylene cracking furnace is completed, the fiber lining surface needs to be leveled, and uneven parts of the fiber lining surface are flapped with a flat plate until sew edges of adjacent fiber modules are kept on the same plane;
- S2, wetting the fiber lining surface; this embodiment differs from the second embodiment in the mass ratio of water in the wetting agent to the silica sol; specifically, the fiber lining surface is wetted; wherein, in order to improve the bonding effect of high-temperature paint and the fiber lining, it is required to wet the fiber lining surface with a wetting agent; the wetting agent is specifically a diluent of silica sol and water, and the solid content of the silica sol is 28-35%, preferably, 30%; a mass ratio of water in the wetting agent to the silica sol is (1.8-2.2):1, preferably, 2:1; 750-850 g of the wetting agent is used per square meter of the fiber lining surface, preferably, 800 g;
- wherein the silica sol may specifically be silicon dioxide sol, and the solid content of the silicon dioxide sol is 28-35%;
- S3, rooting the wetted fiber lining surface; similar to the first embodiment; wherein, a punching machine is used to perforate the fiber lining surface, 3-5 holes are punched for each square meter of the fiber lining, the hole diameter is 10-20 mm, and the hole depth is 20-50 mm; then the paint for rooting is filled into a glue gun, and the paint is injected into the holes with the glue gun until the holes are filled up with the paint for rooting;
- S4, coating the paint wherein, differing from the air pressure and the spraying distance in the second embodiment, the high-temperature paint is coated to the fiber lining surface by applying or spraying before the wetting agent on the fiber lining surface is dried; in a case that the high-temperature paint is applied to the fiber lining surface, the high-temperature paint is applied evenly with a stainless steel trowel for times, and the coating thickness is 3-8 mm; in a case that the high-temperature paint is sprayed to the fiber lining surface, an air compression spraying method is used for spraying; first, a special spraying device is cleaned to ensure that a pipeline of the spraying device is clean and smooth to prevent the spraying device from clogging; then the paint is filled in the spraying device for spraying, the air pressure is 6 kg, the spraying distance is 20-50 cm, the paint is sprayed for 2-3 mm each time, next spraying is performed after natural drying of 30-60 minutes, so on and on until the coating thickness meets the design requirements. 5-10 kg of high-temperature paint is required per square meter of the fiber lining for the applying method and the spraying method.

In addition, expansion sews need to be reserved. In order to avoid the formation of cracks on the surface of the high-temperature paint due to the different expansion coefficients of the fiber lining and the high-temperature paint during use in the furnace, it is required to reserve an expansion sew with a width of 5-10 mm every 3-5 m.

The above high-temperature paint needs to be stirred with a mixer before spraying. If the coating becomes viscous due to long-term storage, water accounting for 1%~2% can be added for dilution and stirring. The stirring must be sufficient so that the coating and water can be evenly mixed.

According to the construction method of the fiber lining surface of the ethylene cracking furnace involved in this specification, the fiber lining surface is leveled and wetted before the coating process, which ensures the bonding of the coating and the fiber lining and improves the bonding strength of the coating and the fiber lining. Before the paint is applied or sprayed, the fiber lining is rooted, and then the high-temperature paint is coated to the fiber lining surface by applying or spraying, so that the coating layer and the paint for rooting and grouting form a whole, and the paint for rooting is fired at high temperature to form a ceramic bond with the surface coating layer, and the coating layer is bonded more firmly. In addition, expansion sews are reserved for the paint after the coating process, which avoids the formation of cracks on the surface of the high-temperature paint due to the different expansion coefficients of the fiber lining and the high-temperature paint during use in the furnace.

The construction method of the fiber lining surface of the ethylene cracking furnace provided by the present application has been described in detail above. The principle and embodiments of the present application are described through specific examples herein. The description of the above-described embodiments is merely used to facilitate understanding of the method and core idea of the present application. It should be noted that, for those skilled in the art, many improvements and modifications may be further made to the present application without departing from the principle of the present application, and these improvements and modifications also fall within the protection scope of claims of the present application.

The invention claimed is:

1. A construction method of a fiber lining surface of an ethylene cracking furnace, comprising the following steps:
   S1, leveling the fiber lining surface;
   S2, wetting the leveled fiber lining surface;
   S3, rooting the wetted fiber lining surface;
   S4, coating, before the fiber lining surface is dried, high-temperature paint to the fiber lining surface that has been rooted; and reserving a plurality of expansion sews on the fiber lining surface during the coating process;
   wherein the step of wetting the leveled fiber lining surface is specifically as follows:
   spraying a wetting agent on the leveled fiber lining surface, wherein the wetting agent is specifically a diluent of silica sol and water, and a solid content of the silica sol is 28-35%;
   in case that a mass ratio of water in the wetting agent to the silica sol is (0.9-1.1): 1, 950-1100 g of the wetting agent is used per square meter of the fiber lining surface; and
   in case that a mass ratio of water in the wetting agent to the silica sol is (1.8-2.2): 1, 750-850 g of the wetting agent is used per square meter of the fiber lining surface.

2. The construction method of the fiber lining surface of the ethylene cracking furnace according to claim 1, wherein the step of leveling the fiber lining surface is specifically as follows:
   flapping uneven parts of the fiber lining surface with a flat plate, so as to keep sew edges of any two adjacent fiber modules in a same plane.

3. The construction method of the fiber lining surface of the ethylene cracking furnace according to claim 1, wherein the step of rooting the wetted fiber lining surface is specifically as follows:
   punching 3-5 holes per square meter of the fiber lining surface, wherein a hole diameter is 10-20 cm, and a hole depth is 20-50 cm; and
   filling up all the holes with the paint.

4. The construction method of the fiber lining surface of the ethylene cracking furnace according to claim 1, wherein the step of coating, before the fiber lining surface is dried, high-temperature paint to the fiber lining surface that has been rooted is specifically as follows:
   coating layer by layer with a stainless steel trowel, wherein the coating thickness of each layer is 3-8 mm, and 5-10 kg of high-temperature paint is used per square meter of the fiber lining surface.

5. The construction method of the fiber lining surface of the ethylene cracking furnace according to claim 1, wherein the step of coating, before the fiber lining surface is dried, high-temperature paint to the fiber lining surface that has been rooted is specifically as follows:
   coating layer by layer with an air compression coating device, wherein each layer is dried for 30-60 minutes after coating, and then the next layer is coated, and 5-10 kg of high-temperature paint is used per square meter of the fiber lining surface.

6. The construction method of the fiber lining surface of the ethylene cracking furnace according to claim 5, wherein the step of coating layer by layer with an air compression coating device is specifically as follows:
   adjusting an air pressure of the air compression coating device to 4 kg, controlling a spraying distance to 20-80 cm, and spraying for 2-3 mm per layer, and coating layer by layer; or,
   adjusting the air pressure of the air compression coating device to 5 kg, controlling the spraying distance to 20-80 cm, and spraying for 2-3 mm per layer, and coating layer by layer; or,
   adjusting the air pressure of the air compression coating device to 6 kg, controlling the spraying distance to 20-50 cm, and spraying for 2-3 mm per layer, and coating layer by layer.

7. The construction method of the fiber lining surface of the ethylene cracking furnace according to claim 1, wherein before the step of coating, before the fiber lining surface is dried, high-temperature paint to the fiber lining surface that has been rooted, the construction method further comprises:
   stirring the high-temperature paint, and when the high-temperature paint becomes viscous due to storage, adding water accounting for 1%~2% to the high-temperature paint for dilution, and stirring, so that the high-temperature paint and water can be evenly mixed.

8. The construction method of the fiber lining surface of the ethylene cracking furnace according to claim 1, wherein the step of reserving a plurality of expansion sews on the fiber lining surface during the coating process is specifically as follows:

reserving an expansion sew with a width of 5-10 mm each time the high-temperature paint is sprayed on the fiber lining surface for 3-5 m.

* * * * *